(12) United States Patent
Hauenschild et al.

(10) Patent No.: US 7,245,828 B2
(45) Date of Patent: Jul. 17, 2007

(54) EXTINCTION RATIO DETERMINATION USING DUTY CYCLE MODULATION

(75) Inventors: Juergen Hauenschild, Bochum (DE); The'Linh Nguyen, San Jose, CA (US)

(73) Assignee: Finisar Coporation, Sunnyvale, CA (US)

( * ) Notice: Subject to any disclaimer, the term of this patent is extended or adjusted under 35 U.S.C. 154(b) by 71 days.

(21) Appl. No.: 11/263,517

(22) Filed: Oct. 31, 2005

(65) Prior Publication Data

US 2006/0120720 A1 Jun. 8, 2006

Related U.S. Application Data

(60) Provisional application No. 60/623,258, filed on Oct. 29, 2004.

(51) Int. Cl.
*H04B 10/08* (2006.01)
(52) U.S. Cl. .......................................... 398/38; 398/197
(58) Field of Classification Search ................ 398/25, 398/38, 195, 197, 198; 372/29.014, 29.021, 372/30
See application file for complete search history.

(56) References Cited

U.S. PATENT DOCUMENTS

| | | | | |
|---|---|---|---|---|
| 5,502,298 A * | 3/1996 | Geller | ........................ | 250/205 |
| 5,535,038 A * | 7/1996 | Hinch | ........................ | 398/182 |
| 6,414,974 B1 * | 7/2002 | Russell et al. | ........... | 372/38.02 |
| 6,459,716 B1 * | 10/2002 | Lo et al. | ..................... | 372/50.1 |
| 6,583,910 B1 * | 6/2003 | Satoh | ........................ | 398/182 |
| 6,993,459 B2 * | 1/2006 | Carrick | ....................... | 702/189 |
| 2003/0141876 A1 * | 7/2003 | Mahgerefteh et al. | ...... | 324/537 |
| 2005/0008050 A1 * | 1/2005 | Fischer et al. | ............. | 372/38.1 |

\* cited by examiner

*Primary Examiner*—Christina Leung
(74) *Attorney, Agent, or Firm*—Workman Nydegger

(57) ABSTRACT

An optical transmitter that determines and controls the extinction ratio of an optical signal by modulating the duty cycle of the optical signal. The transmitter obtains a signal from the monitor circuit that represents optical power emitted by the electro-optic transducer during normal conditions in which the duty cycle of the optical signal is between a bias high and bias low modulation condition. The transmitter also obtains a signal from the monitor circuit that represents optical power emitted during the bias high modulation condition in which the time at the optical high power level in the eye diagram is greater. Also, the transmitter obtains a signal that represents optical power emitted by the electro-optic transducer during the bias low modulation condition in which the time at the optical low power level in the eye diagram is greater. Based on these signals, the transmitter then derives the extinction ratio.

21 Claims, 3 Drawing Sheets

EXTINCTION RATIO DETERMINATION USING DUTY CYCLE MODULATION

CROSS-REFERENCE TO RELATED APPLICATIONS

This application claims the benefit of U.S. Provisional Application No. 60/623,258, filed Oct. 29, 2004, which is incorporated herein by reference in its entirety.

BACKGROUND OF THE INVENTION

1. The Field of the Invention

The present invention relates generally to optical transmitters and receivers. More specifically, the present invention relates to mechanisms for automatically determining the extinction ratio of an optical signal using duty cycle modulation of the optical signal.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Information is conveyed over an optical fiber by transmitting different optical intensities on the fiber. Generally speaking, a relatively high optical power is transmitted onto the optical fiber to assert a logical high onto the fiber. A relatively low optical power is transmitted onto the optical fiber to assert a logical low. The high optical power is obtained by asserting a higher current to the laser. The low optical power is obtained by asserting a lower current to the laser. The laser is not turned off because it takes significant time to saturate a laser to the point where it begins to lase if starting from a laser that is off. In fact, if the current through the laser were to drop below a certain threshold current, it can take much longer to transition to the high optical intensity. In high data rate applications, this could cause significant jitter and possible degradation of the signal. Accordingly, even the low current that enables the low optical intensity should be kept above the threshold current of the laser. If this constraint is met, the laser can transition quickly from the high optical level to the low optical level, and vice versa.

An additional constraint to the high and low optical levels is referred to as the "extinction ratio". The extinction ratio is the ratio of the high optical power level to the low optical power level. The optical high and low power levels are obtained by modulating the current between the higher and lower currents. Typical extinction ratio values range from perhaps 6 dB to 12 dB, with higher levels generally being better but more costly in terms of power requirements.

However, maintaining of a proper extinction ratio is more complex than simply statically determining an appropriate high optical level and an appropriate low optical level, and keeping with that level. Varying temperatures have a profound effect upon the extinction ratio. FIG. 3 illustrates approximate laser current versus optical power curves for several different temperatures including 0, 25 and 70 degrees Celsius. The threshold temperature for 0, 25 and 70 degrees Celsius are illustrated as $T_{TH0}$, $T_{TH25}$ and $T_{TH70}$. The difference in the curves for varying temperatures is exaggerated to illustrate the principles of temperature dependency in the curve. Each laser will have slightly different curves shapes and temperatures dependencies. However, regardless of the laser, the laser tends not to emit significant optical power if the supplied current is below the threshold current. In addition, for all lasers, as temperature rises, threshold current increases and the slope of the curve in the linear region above the threshold current (i.e., the slope efficiency) reduces.

FIG. 3 also shows the low optical level $P_{LOW25}$ for 25 degrees Celsius and the corresponding current $I_{LOW25}$ needed to attain that low power level at 25 degrees Celsius, and a high optical level $P_{HIGH25}$ also for 25 degrees Celsius and the corresponding current $I_{HIGH25}$ needed to attain that high power level at 25 degrees Celsius.

As temperature rises, the threshold current needed for the laser to transmit any significant degree of optical power rises. In addition, the slope of the curve in the linear region above the threshold current becomes less steep. This means that if the temperature were to fall or rise, the optical power emitted by the laser given a constant current will also change. Accordingly, in order to maintain a proper extinction ratio, the extinction ratio is periodically checked and adjusted if needed. This allows the optical transmitter or transceiver to operate under wide-ranging temperature conditions without introducing inordinate amounts of jitter into the transmitted signal, and while maintaining a roughly constant extinction ratio.

The subject matter, claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The foregoing problems with the prior state of the art are overcome by the principles of the present invention, which relate to an optical transmitter (or transceiver) that includes an electro-optic transducer driver, an electro-optic transducer configured to convert electrical signals received from the electro-optic transducer driver to optical signals, and a monitor circuit configured to detect average optical power levels of the optical signals.

Significantly, the optical transmitter also includes an extinction ratio determination module that is configured to automatically determine the extinction ratio of the optical signal. The extinction ratio may then be adjusted as appropriate. Specifically, the extinction ratio determination module obtains a signal from the monitor circuit that represents optical power emitted by the electro-optic transducer during normal conditions in which the duty cycle of the optical signal is between a bias high and bias low modulation condition. The module also obtains a signal from the monitor circuit that represents optical power emitted by the electro-optic transducer during the bias high modulation condition in which the length of time that the optical signal is at the optical high power level in the eye diagram is greater than the length of time that the optical signal is at the optical low power level in the eye diagram. In addition, the module obtains a signal from the monitor circuit that represents optical power emitted by the electro-optic transducer during the bias low modulation condition in which the length of time that the optical signal is at the optical low power level in the eye diagram is greater than the length of time that the optical signal is at the optical high power level in the eye diagram. Based on these signals, the extinction ratio determination module then derives the extinction ratio.

The extinction ratio is derived by modulating the duty cycle of the optical signal, rather than by modulating the high or low optical levels. The modulation of the duty cycle is not susceptible to localized abrupt slope changes in the laser current versus optical power curve. Accordingly, accurate measurements of the extinction ratio may be obtained using the principles of the present invention, even for Vertical Cavity Surface Emitting Lasers (VCSELs) in which the localized slope of the current versus power curve can be unpredictable, even in the linear region.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transmitter that determines and controls the extinction ratio of an optical signal by modulating the duty cycle of the optical signal. The transmitter obtains a signal from the monitor circuit that represents optical power emitted by the electro-optic transducer during normal conditions, during a bias high modulation condition, and during a bias low modulation condition. The transceiver may then use these signals to derive and control the extinction ratio. The extinction ratio may then be adjusted as appropriate by adjusting the laser current corresponding to the optical high and low power levels.

Figure 1A:
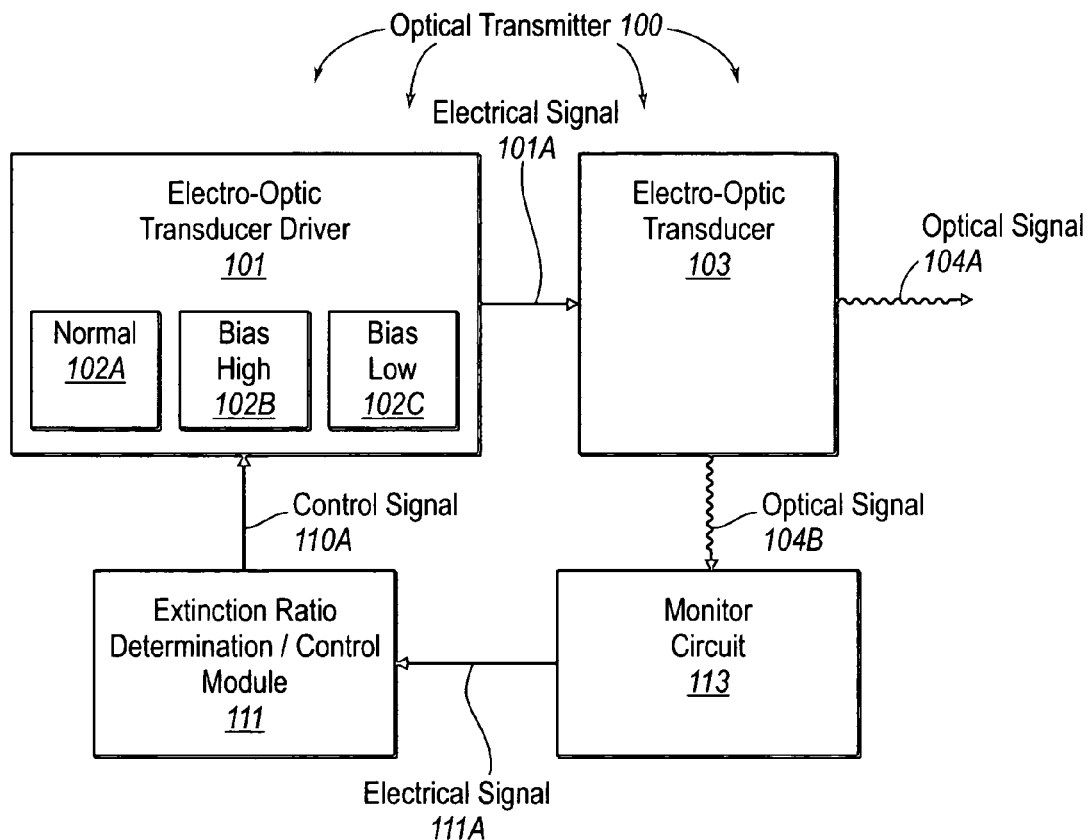
FIG. 1A schematically illustrates an example of an optical transmitter that may determine and control the extinction ratio of an optical signal by modulating the duty cycle of the optical signal in accordance with the principles of the present invention.

FIG. 1A illustrates an optical transmitter 100 in which the principles of the present invention may be employed. While the optical transmitter 100 will be described in some detail, the optical transmitter 100 is described by way of illustration only, and not by way of restricting the scope of the invention. The principles of the present invention are suitable for 1G, 2G, 4G, 10G and higher bandwidth fiber channels. Furthermore, the principles of the present invention may be implemented in laser transmitter/receivers of any form factor such as XFP, SFP and SFF, without restriction. The principles of the present invention may also be applied to an optical transmitter in any environment, even in an environment that includes an optical receiver. Accordingly, the principles of the present invention may be implemented in an optical transceiver environment.

Figure 2:
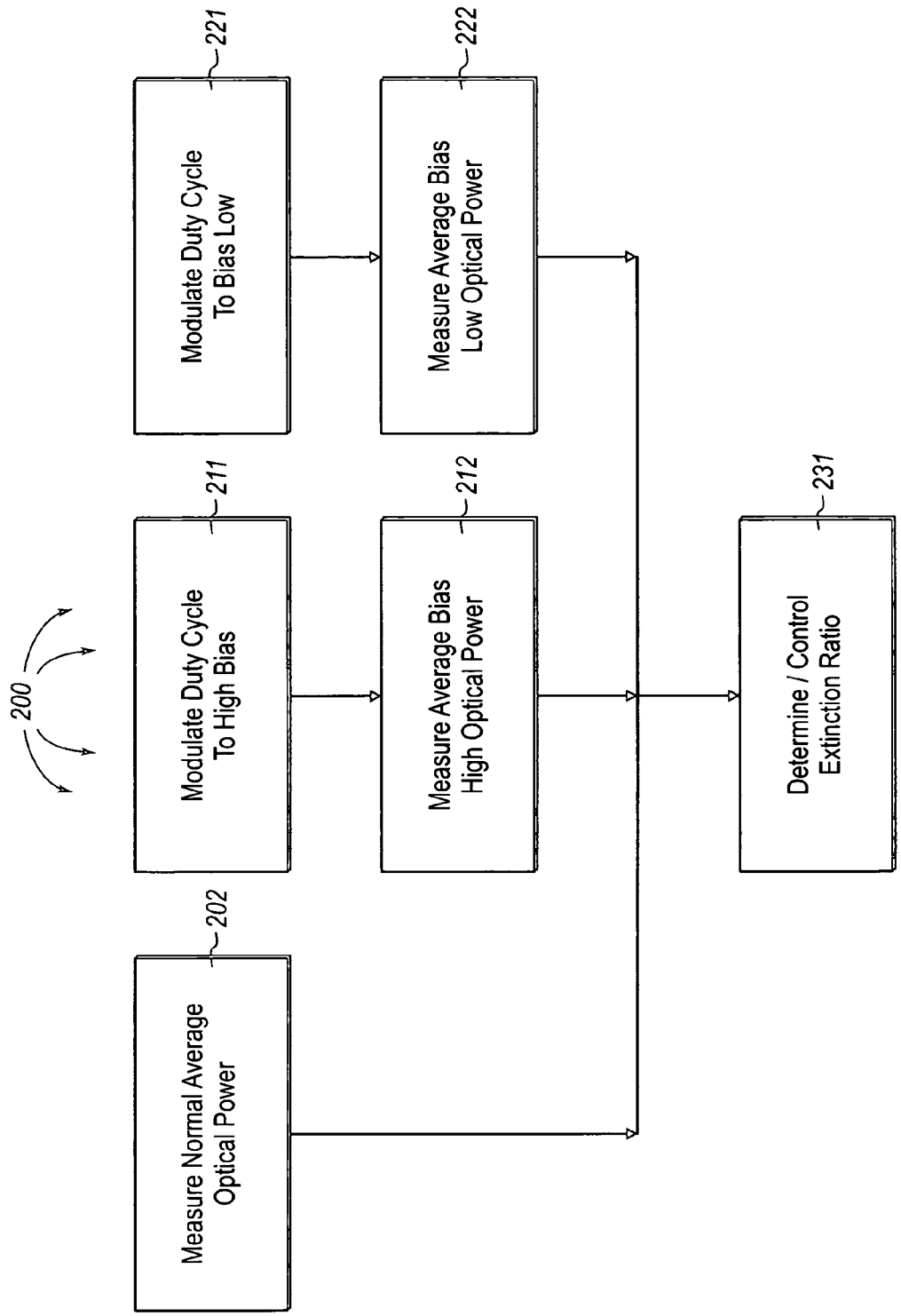
FIG. 2 illustrates a flowchart of a method for determining and controlling the extinction ratio of an optical signal by modulating the duty cycle of the optical signal in accordance with the principles of the present invention.
Figure 3:
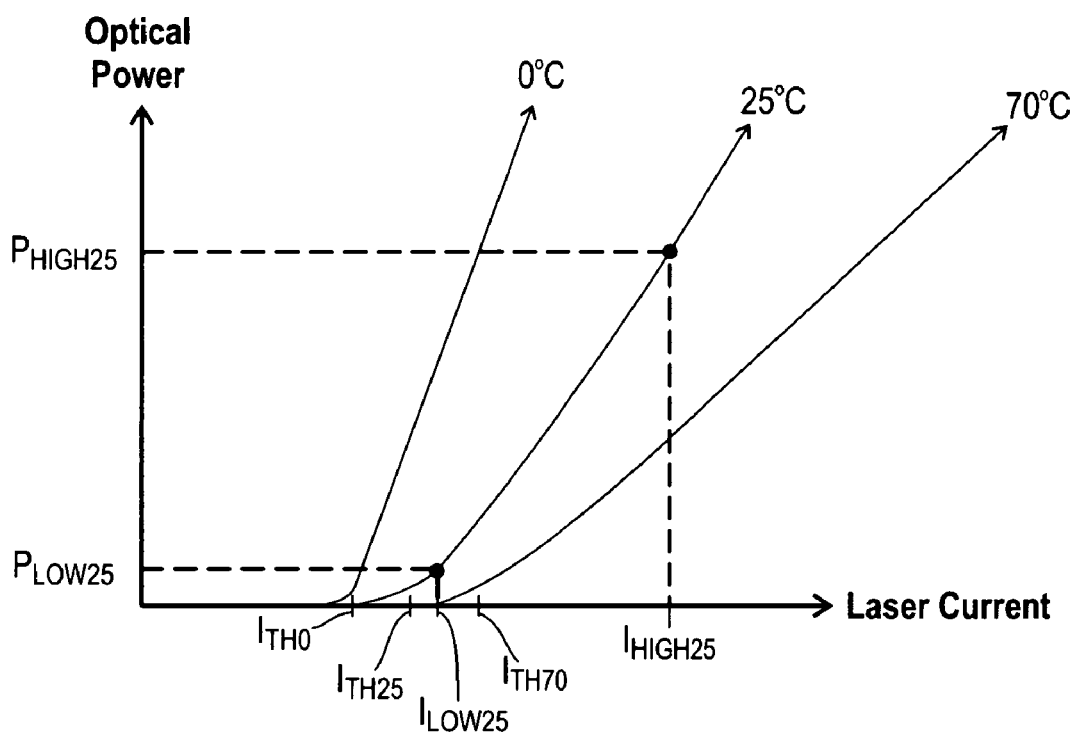
FIG. 3 illustrates a conventionally known relation between optical power, laser current and temperature.

FIG. 1A schematically illustrates an optical transmitter 100 that determines and controls the extinction ratio of the optical signal by modulating the duty cycle of the optical signal. FIG. 2 illustrates a flowchart of a method 200 for the optical transmitter of FIG. 1A to determine and control the extinction ratio of an optical signal. As the method 200 of FIG. 2 may be performed by the optical transmitter 100 of FIG. 1A, FIGS. 1A and 2 will now be described with frequent reference to each other.

FIG. 1A illustrates an optical transmitter 100 that includes an electro-optic transducer driver 101 and an electro-optic transducer 103. The electro-optic transducer driver 101 generates an electrical signal 101A that is to be converted into an optical signal 104. If the electro-optic transducer 103 is a laser, then the electro-optic transducer driver 101 may be a laser driver. If the electro-optic transducer 103 is a Vertical Cavity Surface Emitting Laser (VCSEL), then the electro-optic transducer driver 101 may be a laser driver suitable for VCSELs. If the electro-optic transducer 103 is a Light Emitting Diode (LED), then the electro-optic transducer driver 101 may be a LED driver.

The electro-optic transducer driver 101 is capable of operating in three different modes with respect to duty cycle modulation; namely, normal mode 102A, bias high modulation mode 102B, and bias low modulation mode 102C. These operational modes are represented symbolically using boxes 102A, 102B and 102C. These three modes may best be understood with respect to the eye diagram 120 of FIG. 1B.

The eye diagram 120 illustrates an optical high power level 121 and an optical low power level 122, and various other optical signals 131, 132, 141, 142, 151 and 152. Although the eye diagram 120 illustrates an eye diagram 120 for the optical signal 104, the eye diagram 120 could just as easily be used to represent the electrical signal 101A. In any mode of operation, the differential signals are required to be outside of an eye mask 123 that is defined by the communications protocol.

Figure 1B:
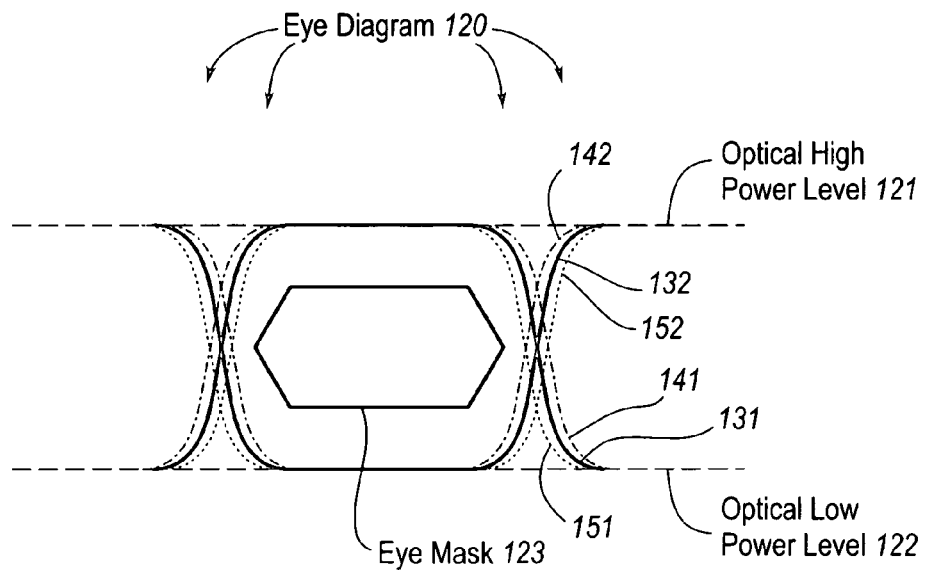
FIG. 1B illustrates an eye diagram that demonstrates the bias high modulation of the duty cycle, the bias low modulation of the duty cycle, and the normal duty cycle.

During normal operation mode or condition 102A, the differential optical signals are represented by the solid lines 131 and 132 in FIG. 1B. In this case, the length of time that the optical signal is at the optical high power level 121 is approximately the same as the length of time that the optical signal is at the optical low power level 122, or is at least between the bias high modulation condition 102B and the bias low modulation condition 102C.

During bias high operation mode or condition 102B, the differential optical signals are represented by the intermitted dotted/dashed lines 141 and 142. In this case, the length of time that the optical signal is at the optical high power level 121 is greater than the length of time that the optical signal is at the optical low power level 122.

During bias low operation mode or condition 102C, the differential optical signals are represented by the dotted lines 151 and 152. In this case, the length of time that the optical signal is at the optical low power level 122 is greater than the length of time that the optical signal is at the optical low power level 121. Note that during any of these operational modes, the signals remain outside of the eye mask 123 thereby conforming to the communication protocol that defines the eye mask 123.

Referring back to FIG. 1B, a portion 104A of the optical signal may be transmitted onto, for example, an optical fiber. Another portion 104B of the optical signal may be received by a monitor circuit 113. The monitor circuit 113 detects average optical power levels of the optical signals. Circuits capable of detecting average power are known in the art. In one example implementation, the monitor circuit 113 may include a monitor circuit that converts the optical signal back into an electrical signal, and that includes a low pass filter that filters the electrical signal to generate an approximation of the average optical power received by the monitor circuit 113. The signal representing the average detected power 111A is then provided to an extinction ratio determination/control module 111, that controls much of the process using control signals 110A as described with respect to FIG. 2.

FIG. 2 illustrates a flowchart of a method 200 for the optical transmitter 100 to automatically determine (or control) an extinction ratio of an optical signal by modulating the duty cycle of the optical signal in accordance with the principles of the present invention.

The average normal optical power is measured (act 202). The normal average optical power being the optical power emitted by the electro-optic transducer 103 under the normal modulation condition 102A. In one embodiment, the extinction ratio determination/control module 111 causes the electro-optic transducer driver 101 to enter the normal modulation condition 102A and then obtains the resulting signal from the monitor circuit 113. The obtained signal thus represents the optical power emitted by the electro-optic transducer 103 during the normal conditions in which the duty cycle of the optical signal is between a bias high and bias low modulation condition.

In addition, the optical transmitter modulates the duty cycle of the optical signal emitted by the electro-optic transducer to the bias high condition 102B (act 211). Then, the average bias high optical power is measured (act 212). The average bias high optical power is the optical power emitted by the electro-optic transducer 103 during bias high modulation condition 102B. In one embodiment, the extinction ratio determination/control module 111 causes the electro-optic transducer driver 101 to enter the bias high modulation condition 102B and then obtains the resulting signal from the monitor circuit 113. The obtained signal thus represents the optical power emitted by the electro-optic transducer 103 during the bias high modulation condition.

Furthermore, the optical transmitter modulates the duty cycle of the optical signal emitted by the electro-optic transducer to the bias low condition 102B (act 221). Then, the average bias low optical power is measured (act 222). The average bias low optical power is the optical power emitted by the electro-optic transducer 103 during bias low modulation condition 102C. In one embodiment, the extinction ratio determination/control module 111 causes the electro-optic transducer driver 101 to enter the bias low modulation condition 102C and then obtains the resulting signal from the monitor circuit 113. The obtained signal thus represents the optical power emitted by the electro-optic transducer 103 during the bias low modulation condition.

At this stage, the average normal bias optical power (hereinafter referred to by the parameter $P_{AVENORM}$), the average bias high optical power (hereinafter referred to by the parameter $P_{AVEHIGH}$), and the average bias low optical power (hereinafter referred to by the parameter $P_{AVELOW}$) have been obtained by the extinction ratio determination/control module 111. Once this information, the extinction ratio may be determined and controlled (act 231).

As a specific example of the extinction ratio determination and control, suppose that the statistics of the source are known to be 50% high and 50% low and uncorrelated. In the normal case, the length of time used to represent a logical high is the same as the length of time used to represent a logical low. Accordingly, the average normal optical power measured over a large data sequence (e.g., 100 data samples or more) may be expected to approach $0.5 \times P_{HIGH} + 0.5 \times P_{LOW}$ as the length of the data sequence increases to infinity by the law of large numbers, wherein $P_{HIGH}$ is the optical high power level, and $P_{LOW}$ is the optical low power level. This is expressed by the following Equation 1:

$$P_{AVENORM} = 0.5 \times P_{HIGH} + 0.5 \times P_{LOW} \quad (1)$$

With these same source statistics, suppose that in the bias high modulation condition, a logical high is represented with a length of time that is 51/49 (1 and 2/49ths) times the length of time used to represent a logical low. In this case, over time, the measured average bias high modulation power is expressed as follows in Equation 2:

$$P_{AVEHIGH} = 0.51 \times P_{HIGH} + 0.49 \times P_{LOW} \quad (2)$$

Once again with these same source statistics, suppose that in the bias low modulation condition, a logical low is represented with a length of time that is 51/49 (1 and 2/49ths) times the length of time used to represent a logical high. In this case, over time, the measured average bias high modulation power is expressed as follows in Equation 3:

$$P_{AVELOW} = 0.49 \times P_{HIGH} + 0.51 \times P_{LOW} \quad (3)$$

With this information, the extinction ratio determination/control circuit 111 may obtain a difference signal representing a difference in magnitude between the measured average bias high optical power and the average bias low optical power. This may be accomplished by providing the signals $P_{AVEHIGH}$ and $P_{AVELOW}$ to a differential amplifier. If the differential amplifier had a gain of 50 in this case, the resulting output signal ($P_{DIFF}$) may be expressed by Equation 4 as follows:

$$P_{DIFF} = 50 \times (P_{AVEHIGH} - P_{AVELOW}) \quad (4)$$

Substituting Equations 2 and 3 into Equation 4, we obtain the following Equation 5:

$$P_{DIFF} = P_{HIGH} - P_{LOW} \quad (5)$$

Also, Equations 6 and 7 are true to define PHIGH and PLOW.

$$P_{HIGH} = P_{AVENORM} + 0.5 \times P_{DIFF} \quad (6)$$

$$P_{LOW} = P_{AVENORM} - 0.5 \times P_{DIFF} \quad (7)$$

Accordingly, a signal representing the measured high optical power $P_{HIGH}$ may be obtained using a signal divider (for dividing $P_{DIFF}$ by 2) and by using an analog adder to add the resulting value to $P_{AVENORM}$. Similarly, an analog subtractor may be used to subtract the resulting value from $P_{AVENORM}$ to obtain $P_{LOW}$. The extinction ratio may then be derived based on these two resulting values using the following Equation 8:

$$ER = P_{HIGH}/P_{LOW} \quad (8)$$

Once the extinction ratio has been determined, the high and low current levels may be adjusted as appropriate to adjust the extinction ratio. This monitoring of the extinction ratio may be continuously or periodically performed to ensure that the extinction ratio is with proper control. Significantly, by using duty cycle modulation to determine and control the extinction ratio, the extinction ratio calibration is not subject to localized unpredictability in the optical power versus laser current curve that can be present in some electro-optic transducers such as VCSELs. Accordingly, more stable extinction ratio control may be achieved.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for an optical transmitter to automatically determine an extinction ratio of an optical signal by modulating the duty cycle of the optical signal, the method comprising the following:
   an act of measuring an average normal optical power, the normal optical power being the optical power emitted by the electro-optic transducer under conditions in which the duty cycle of the optical signal is between a bias high and bias low modulation condition;
   an act of modulating the duty cycle of the optical signal emitted by the electro-optic transducer to the bias high condition in that the length of time that the optical signal is at the optical high power level in the eye diagram is greater than the length of time that the optical signal is at the optical low power level in the eye diagram;
   an act of measuring an average bias high optical power, the bias high optical power being the optical power emitted by the electro-optic transducer during the act of modulating the duty cycle of the optical signal emitted by the electro-optic transducer to the bias high condition;
   an act of modulating the duty cycle of the optical signal emitted by the electro-optic transducer to the bias low condition such that the length of time that the optical signal is at the optical low power level is the eye diagram is greater than the length of time that the optical signal is at the optical high power level in the eye diagram;
   an act of measuring an average bias low optical power, the bias low optical power being the optical power emitted by the electro-optic transducer during the act of modulating the duty cycle of the optical signal emitted by the electro-optic transducer to the bias low condition; and
   an act of deriving an extinction ratio for the optical signal based on the measured average normal optical power, the measured average bias high optical power, and the measured average bias low optical power.

2. A method in accordance with claim 1, wherein the optical transmitter is an optical transceiver.

3. A method in accordance with claim 1, wherein the act of measuring the average normal optical power, the act of measuring the average bias high optical power, and the act of measuring the average bias low optical power are all performed by a monitor photo-diode.

4. A method in accordance with claim 1, wherein the electro-optic transducer is one of a Light Emitting Diode (LED), a laser, and a Vertical Cavity Surface Emitting Laser (VCSEL).

5. A method in accordance with claim 1, wherein the act of measuring the average bias high optical power occurs over at least one hundred data cycles.

6. A method in accordance with claim 1, wherein the act of measuring the average bias low optical power occurs over at least one hundred data cycles.

7. A method in accordance with claim 1, wherein the act of deriving an extinction ratio for the optical signal comprises the following:
   an act of obtaining a difference signal representing a difference in magnitude between the measured average bias high optical power and the average bias low optical power; and
   an act of deriving the extinction ratio for the optical signal based on the measured normal optical power and the difference in magnitude between the measured average bias high optical power and the average bias low optical power.

8. A method in accordance with claim 7, wherein the act of deriving the extinction ratio for the optical signal based on the measured normal optical power and the difference in magnitude between the measured average bias high optical power and the average bias low optical power comprises the following:
   an act of generating a signal that represents the high optical level by adding half of the difference in magnitude to the measured normal optical power;
   an act of generating a signal that represents the low optical level by subtracting half of the difference in magnitude from the measured normal optical power; and
   an act of obtaining the extinction ratio by dividing the high optical level by the low optical level.

9. A method in accordance with claim 1, further comprising the following:
   an act of adjusting the extinction ratio based on the derived extinction ratio.

10. An optical transmitter comprising the following:
an electro-optic transducer driver;
an electro-optic transducer configured to convert electrical signals received from the electro-optic transducer driver to optical signals;
a monitor circuit configured to detect average optical power levels of the optical signals;
an extinction ratio determination module configured to determine the extinction ratio of the optical signal by performing the following:
an act of obtaining a signal from the monitor circuit that represents optical power emitted by the electro-optic transducer during normal conditions in which the duty cycle of the optical signal is between a bias high and bias low modulation condition;
an act of obtaining a signal from the monitor circuit that represents optical power emitted by the electro-optic transducer during the bias high modulation condition in which the length of time that the optical signal is at the optical high power level in the eye diagram is greater than the length of time that the optical signal is at the optical low power level in the eye diagram;
an act of obtaining a signal from the monitor circuit that represents optical power emitted by the electro-optic transducer during the bias low modulation condition in which the length of time that the optical signal is at the optical low power level in the eye diagram is greater than the length of time that the optical signal is at the optical high power level in the eye diagram; and
an act of deriving an extinction ratio for the optical signal based on the measured average normal optical power, the measured average bias high optical power, and the measured average bias low optical power.

11. An optical transmitter in accordance with claim 10, wherein the extinction ratio determination module is further configured to perform the following:
an act of causing the electro-optic transducer to enter the bias high modulation condition by signaling the electro-optic transducer driver to send appropriate electrical signals for the bias high modulation condition; and
an act of causing the electro-optic transducer to enter the bias low modulation condition by signaling the electro-optic transducer driver to send appropriate electrical signals for the bias low modulation condition.

12. An optical transmitter in accordance with claim 10, wherein the optical transmitter is an optical transceiver.

13. An optical transmitter in accordance with claim 10, wherein the electro-optic transducer is one of a Light Emitting Diode (LED), a laser and a Vertical Cavity Surface Emitting Laser (VCSEL).

14. An optical transmitter in accordance with claim 10, wherein the extinction ratio determination module is configured to perform the act of deriving an extinction ratio for the optical signal by performing the following:
an act of obtaining a difference signal representing a difference in magnitude between the measured average bias high optical power and the average bias low optical power; and
an act of deriving the extinction ratio for the optical signal based on the measured normal optical power and the difference in magnitude between the measured average bias high optical power and the average bias low optical power.

15. An optical transmitter in accordance with claim 14, wherein extinction ratio determination module is configured to perform the act of deriving the extinction ratio for the optical signal based on the measured normal optical power and the difference in magnitude between the measured average bias high optical power and the average bias low optical power by performing the following:
an act of generating a signal that represents the high optical level by adding half of the difference in magnitude to the measured normal optical power;
an act of generating a signal that represents the low optical level by subtracting half of the difference in magnitude from the measured normal optical power; and
an act of obtaining the extinction ratio by dividing the high optical level by the low optical level.

16. An optical transmitter in accordance with claim 10, wherein the optical transmitter is further configured to perform the following:
an act of adjusting the extinction ratio based on the derived extinction ratio.

17. An optical transmitter in accordance with claim 10, wherein the optical transceiver is one of a 1G laser transceiver, a 2G laser transceiver, a 4G laser transceiver, a 8G laser transceiver, or a 10G laser transceiver.

18. An optical transmitter in accordance with claim 10, wherein the optical transceiver is a laser transceiver suitable for fiber channels greater than 10G.

19. An optical transmitter in accordance with claim 10, wherein the optical transceiver is one of a XFP laser transceiver, a SFP laser transceiver, or a SFF laser transceiver.

20. A method for an optical transmitter to automatically control an extinction ratio of an optical signal by modulating the duty cycle of the optical signal, the method comprising the following:
an act of measuring an average normal optical power, the normal optical power being the optical power emitted by the electro-optic transducer under conditions in which the duty cycle of the optical signal is between a bias high and bias low modulation condition;
an act of modulating the duty cycle of the optical signal emitted by the electro-optic transducer to the bias high condition in that the length of time that the optical signal is at the optical high power level in the eye diagram is greater than the length of time that the optical signal is at the optical low power level in the eye diagram;
an act of measuring an average bias high optical power, the bias high optical power being the optical power emitted by the electro-optic transducer during the act of modulating the duty cycle of the optical signal emitted by the electro-optic transducer to the bias high condition;
an act of modulating the duty cycle of the optical signal emitted by the electro-optic transducer to the bias low condition such that the length of time that the optical signal is at the optical low power level is the eye diagram is greater than the length of time that the optical signal is at the optical high power level in the eye diagram;
an act of measuring an average bias low optical power, the bias low optical power being the optical power emitted by the electro-optic transducer during the act of modulating the duty cycle of the optical signal emitted by the electro-optic transducer to the bias low condition; and
an act of controlling an extinction ratio for the optical signal based on the measured average normal optical power, the measured average bias high optical power, and the measured average bias low optical power.

21. An optical transmitter comprising the following:

an electro-optic transducer driver;

an electro-optic transducer configured to convert electrical signals received from the electro-optic transducer driver to optical signals;

a monitor circuit configured to detect average optical power levels of the optical signals;

an extinction ratio control module configured to control the extinction ratio of the optical signal by performing the following:

an act of obtaining a signal from the monitor circuit that represents optical power emitted by the electro-optic transducer during normal conditions in which the duty cycle of the optical signal is between a bias high and bias low modulation condition;

an act of obtaining a signal from the monitor circuit that represents optical power emitted by the electro-optic transducer during the bias high modulation condition in which the length of time that the optical signal is at the optical high power level in the eye diagram is greater than the length of time that the optical signal is at the optical low power level in the eye diagram;

an act of obtaining a signal from the monitor circuit that represents optical power emitted by the electro-optic transducer during the bias low modulation condition in which the length of time that the optical signal is at the optical low power level in the eye diagram is greater than the length of time that the optical signal is at the optical high power level in the eye diagram; and an act of controlling an extinction ratio for the optical signal based on the measured average normal optical power, the measured average bias high optical power, and the measured average bias low optical power.

* * * * *

UNITED STATES PATENT AND TRADEMARK OFFICE
CERTIFICATE OF CORRECTION

PATENT NO. : 7,245,828 B2  Page 1 of 1
APPLICATION NO. : 11/263517
DATED : July 17, 2007
INVENTOR(S) : Hauenschild et al.

It is certified that error appears in the above-identified patent and that said Letters Patent is hereby corrected as shown below:

Column 4
Line 53, before "LED driver", change "a" to --an--

Column 5
Line 27, remove "104A"
Line 28, after "signal", insert --104A--
Line 29, remove "104B"
Line 30, after "optical signal", insert --104A--

Column 6
Line 8, change "102B" to --102C--

Column 10
Line 27, before "XFP", change "a" to --an--
Line 28, before "SFP", change "a" to --an--
Line 28, before "SFF", change "a" to --an--

Signed and Sealed this

Twenty-third Day of September, 2008

JON W. DUDAS
*Director of the United States Patent and Trademark Office*